(12) United States Patent
Kim et al.

(10) Patent No.: US 9,123,277 B2
(45) Date of Patent: Sep. 1, 2015

(54) APPARATUS AND METHOD FOR DISPLAYING SCREEN ACCORDING TO INTENSITY OF BRIGHTNESS OF AMBIENT LIGHT

(75) Inventors: Jong-Man Kim, Ansan-si (KR); Sung-Dae Cho, Yongin-si (KR); Hyun-Hee Park, Seoul (KR); Young-Min Jeong, Suwon-si (KR); Min-Woo Lee, Suwon-si (KR); Yun-Je Oh, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1608 days.

(21) Appl. No.: 12/479,313

(22) Filed: Jun. 5, 2009

(65) Prior Publication Data
US 2010/0033457 A1 Feb. 11, 2010

(30) Foreign Application Priority Data
Aug. 6, 2008 (KR) .................. 10-2008-0076936

(51) Int. Cl.
| G09G 5/00 | (2006.01) |
| G09G 3/20 | (2006.01) |
| G09G 5/02 | (2006.01) |
| G09G 3/36 | (2006.01) |
| H04N 5/58 | (2006.01) |
| H04N 21/422 | (2011.01) |
| H04N 21/431 | (2011.01) |

(52) U.S. Cl.
CPC ............. *G09G 5/02* (2013.01); *G09G 3/2003* (2013.01); *G09G 3/3607* (2013.01); *H04N 5/58* (2013.01); *H04N 21/42202* (2013.01); *H04N 21/4318* (2013.01); *G09G 2320/066* (2013.01); *G09G 2340/06* (2013.01); *G09G 2360/144* (2013.01); *G09G 2360/16* (2013.01)

(58) Field of Classification Search
USPC ........... 345/204, 207, 690, 60, 63, 76, 77, 82, 345/87, 89; 348/227.1
See application file for complete search history.

(56) References Cited

U.S. PATENT DOCUMENTS

| 7,936,258 B2 * | 5/2011 | Pala et al. ..................... 340/461 |
| 2002/0105581 A1 * | 8/2002 | Masaki et al. .............. 348/229.1 |
| 2002/0113801 A1 * | 8/2002 | Reavy et al. .................. 345/589 |

(Continued)

FOREIGN PATENT DOCUMENTS

| CN | 101048812 | 10/2007 |
| EP | 0 863 677 | 9/1998 |

(Continued)

OTHER PUBLICATIONS

European Search Report dated Aug. 2, 2012 in a counterpart Application No. 09163846.0-2205.

*Primary Examiner* — Charles V Hicks
*Assistant Examiner* — Jeffrey S Steinberg
(74) *Attorney, Agent, or Firm* — The Farrell Law Firm, P.C.

(57) ABSTRACT

Disclosed are an apparatus and a method for display of a screen according to brightness intensity of ambient light. One or more characteristic values configuring display data is set to be higher than a preset color characteristic value when measured brightness intensity of ambient light is higher than preset brightness intensity of ambient light, and one of the set color characteristic values is converted to a contrast characteristic value and is displayed. Therefore, even when brightness intensity of ambient light is high, the user can accurately view a screen.

10 Claims, 6 Drawing Sheets

(56) References Cited

U.S. PATENT DOCUMENTS

| | | |
|---|---|---|
| 2005/0037815 A1* | 2/2005 | Besharat et al. .............. 455/566 |
| 2005/0068332 A1 | 3/2005 | Diefenbaugh et al. |
| 2005/0146492 A1* | 7/2005 | Baba et al. ...................... 345/87 |
| 2005/0212824 A1* | 9/2005 | Marcinkiewicz et al. .... 345/690 |
| 2005/0231457 A1 | 10/2005 | Yamamoto et al. |
| 2006/0109488 A1 | 5/2006 | Park |
| 2006/0164408 A1* | 7/2006 | Nishikawa et al. ........... 345/207 |
| 2007/0103397 A1* | 5/2007 | Correa et al. ................... 345/63 |
| 2007/0146356 A1* | 6/2007 | Ladouceur ................... 345/207 |
| 2007/0165946 A1* | 7/2007 | Hong et al. ................... 382/167 |
| 2009/0174725 A1 | 7/2009 | Kim et al. |

FOREIGN PATENT DOCUMENTS

| | | |
|---|---|---|
| EP | 1 569 194 | 8/2005 |
| EP | 1 942 680 | 7/2008 |
| KR | 1020050015478 | 2/2005 |
| KR | 1020060041848 | 5/2006 |
| KR | 1020060056458 | 5/2006 |
| KR | 1020060121313 | 11/2006 |
| KR | 1020090076033 | 7/2009 |

* cited by examiner

| BACKGROUND COLOR | TEXT COLOR |
|---|---|
| BLACK | WHITE |
| RED | WHITE AND YELLOW |
| BLUE | WHITE |
| YELLOW | BLACK AND BLUE |
| YELLOWISH GREEN | BLACK AND BLUE |

APPARATUS AND METHOD FOR DISPLAYING SCREEN ACCORDING TO INTENSITY OF BRIGHTNESS OF AMBIENT LIGHT

PRIORITY

This application claims priority to an application entitled "Apparatus And Method For Displaying Screen According To Intensity Of Brightness Of Ambient Light" filed in the Korean Industrial Property Office on Aug. 6, 2008 and assigned Serial No. 10-2008-0076936, the contents of which are incorporated herein by reference.

BACKGROUND OF THE INVENTION

1. Field of the Invention

The present invention relates generally to an apparatus and a method for displaying a screen, and more particularly to an apparatus for displaying a screen of a mobile communication terminal according to a brightness intensity of ambient light.

2. Description of the Related Art

When a user looks at a mobile communication terminal screen, if the degree of the brightness of ambient light is high, the screen has a dark appearance. Therefore, the user may not recognize configuration elements such as icons, texts, and background. In addition, since the screen looks dark, the user can not grasp color tones corresponding to such configuration elements. In order to resolve this problem, there are methods for setting the brightness intensity of the mobile communication terminal screen higher than its predetermined intensity. The brightness of a screen backlight, thereby allowing the screen can be increased to be brighter. There is another method for setting brightness intensity and saturation intensity of each pixel configuring a screen to be higher than the predetermined brightness and saturation intensities by using a converting line shaped like an S-curve, thereby allowing the screen to be shown brightly.

Conventionally, when the mobile communication terminal screen is dark due to the high intensity of the brightness intensity of ambient light, the brightness intensity of the backlight is set to be higher than pre-existing brightness intensity thereof or the brightness and saturation intensities of each pixel configuring the screen is set to be higher than previously set, to improve screen visualization.

However, when brightness intensity of the backlight is set to be higher than previous brightness intensity as described above, there is a limit in setting brightness intensity in consideration of the characteristic of the backlight. For example, an apparatus having a limited power supply, such as a mobile communication terminal, consumes increased power because due to its continuous use for setting brightness intensity of the backlight to be higher than pre-existing brightness intensity thereof.

In addition, when brightness and saturation intensities of each pixel configuring a screen is set to be higher than previously set moving pictures and still pictures where various color tones are uniformly distributed on each pixel thereof can be shown brightly to the user. However, it is difficult for color tones to be shown brightly to the user even though brightness intensity of the screen with pixels, to which colors are distributed, is set higher than normal. Therefore, the present invention discloses an apparatus and a method of setting a screen according to brightness intensity of ambient light.

SUMMARY OF THE INVENTION

Accordingly, the present invention has been made to solve the above-mentioned problems occurring in the prior art, and the present invention provides an apparatus for displaying a screen according to brightness intensity of ambient light, the apparatus including a measuring sensor for measuring brightness intensity of ambient light a display unit for displaying display data and a controller, which sets one or more color characteristic values configuring the display data to be higher than a preset value when brightness intensity of ambient light measured by the measuring sensor is higher than preset brightness intensity of ambient light, converts one of the set color characteristic values to a characteristic value in contrast with the one color characteristic value, and displays the converted value through the display unit.

Also, the present invention provides a method for displaying a screen according to brightness intensity of ambient light, including setting one or more characteristic values configuring display data to be higher than a preset color characteristic value when measured brightness intensity of ambient light is higher than preset brightness intensity of ambient light after brightness intensity of ambient light is measured converting one of the set color characteristic values to a contrast characteristic value and displaying display data having a color characteristic value including the converted characteristic value.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings. In the following description and drawings, a detailed description of known functions and configurations incorporated herein will be omitted for the sake of clarity and conciseness.

Figure 1:
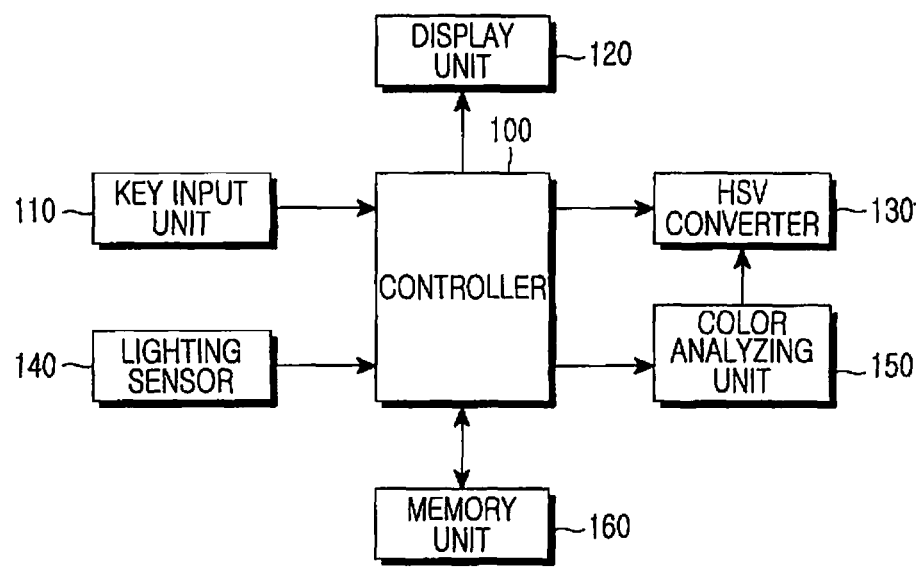
FIG. 1 illustrates an apparatus for displaying a screen according to the present invention.

FIG. 1 illustrates an apparatus for displaying a screen according to the present invention.

The apparatus includes a controller 100, a key input unit 110, a display unit 120, HSV (Hue, Saturation, and Value) converter 130, a lighting sensor 140, a color analyzing unit 150, and a memory unit 160.

The controller 100 controls the overall operation of the mobile terminal. Particularly, the controller 100 determines whether the brightness intensity of ambient light, which has been detected through the lighting sensor 140, is higher than predetermined brightness intensity thereof. The predetermined brightness intensity refers to a maximum brightness intensity of ambient light, which allows the user to view the screen. If the detected brightness intensity is higher than the predetermined brightness intensity, the controller 100 RGB (Red, Green, and Blue) converts the display data to HSV data using spaces of luminosity, saturation, and color tone through the HSV converter 130. Although an example where RGB data is converted to HSV data is described in the present invention, it is also possible to convert RGB data to any color space data using spaces of luminosity, saturation, and color tone as well as HSV data. Also RGB data can be converted to HSV data when it is required to set a screen through the key input unit 110 when the brightness intensity of the ambient light, which has been detected through the lighting sensor 140, is higher than predetermined brightness intensity thereof.

Also, the controller 100 sets a luminosity value and a saturation value so as to allow a light-darkness contrast ratio of HSV data to become higher than a light-darkness contrast ratio preset through the HSV converter 130.

For example, the controller 100 converts an existing luminosity value and a previous saturation value to a luminosity value and a previous saturation value, which have been preset to have a light-darkness contrast ratio higher than a previous light-darkness contrast ratio, respectively, by using a conversion-curve function with an S-curve shape or a gamma-curve shape, and stores the converted values into the memory unit 160. At this time, the preset luminosity value and the saturation value refer to values pre-stored in the memory unit 160 for setting the light-darkness contrast ratio of HSV data to be higher than a previous light-darkness contrast ratio.

For example, it is assumed that a luminosity value and a saturation value of HSV data, set in a mobile communication terminal, have a value in the range of $\{0, 10, 20, 30, \ldots 80, 90,$ and $100\}$, and a conversion curve line with an S-curve shape is used when a luminosity value is set.

When the conversion curve line with an S-curve shape is used, input values of $\{0, 10, 20, 30, \ldots 80, 90,$ and $100\}$ may be output as output values of $\{0, 0, 0, 10, 30, 50, 80, 90, 100, 100,$ and $100\}$. Particularly, under the control of the controller 100, a part of the screen with a small luminosity value is set to have a smaller value, and a part of the screen with a large luminosity value is set to have a larger value. This is equally applied when a saturation value is set.

In this manner, the controller 100 sets a light-darkness contrast ratio higher than a light-darkness contrast ratio, which has been previously set, so as to improve visibility. Therefore, a dark part of an image appears darker and a bright part of the image appears brighter.

Meanwhile, the controller 100 forms a color distribution histogram showing distribution of a plurality of colors included in HSV data converted through the color analyzing unit 150. Such a color distribution histogram is shown in FIG. 2A.

In order to increase a color value of the HSV data to a value higher than a preset color value, the controller 100 determines a color with a value equal to or higher than a preset color selection critical value. Particularly, the controller 100 selects a color to be shown deeper in shade than previous state to the user.

Figure 2A:
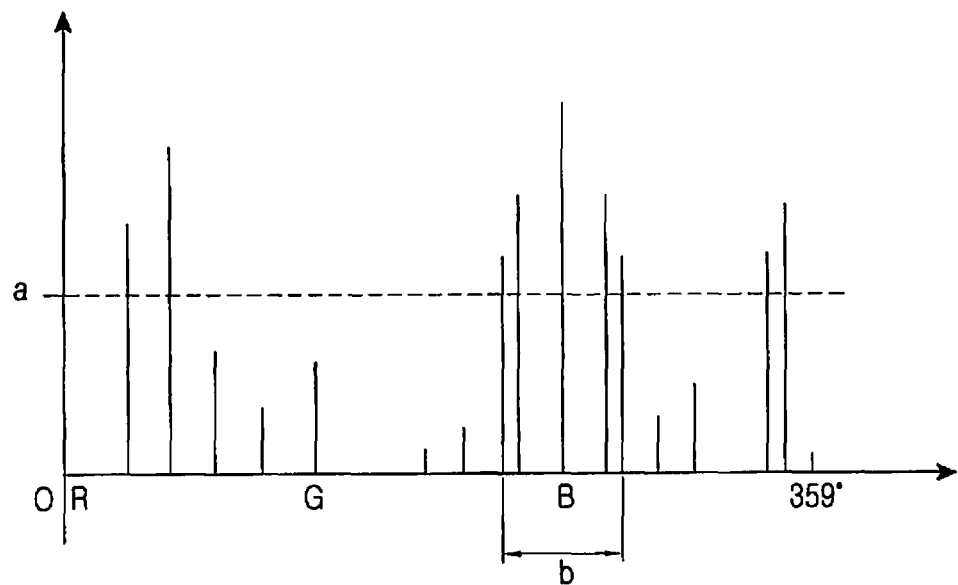
FIGS. 2A and 2B are illustrate a color tone distribution histogram according to the present invention.

FIG. 2A illustrates a color distribution histogram of HSV data.

The controller 100 determines a color with a value equal to or higher than a preset color selection critical value 'a' in the color distribution histogram shown in FIG. 2A. At this time, the controller 100 may determine red color (R) and blue color (B) so as to move a color value of HSV data to a color value of a primary color rather than a preset color value. Colors with each value equal to or higher than the color selection critical value 'a' are excluded when colors are determined so as not to influence all of the HSV data colors.

As such, when the color of the HSV data has been determined, the controller 100 sets a color value of a color determined through the HSV converter 130 as a primary color with a pre-existing color value. That is, the controller 100 densely sets a color range of the determined color toward a primary color so that the color is shown brighter and more distinct to the user in comparison with a previous color.

Figure 2B:
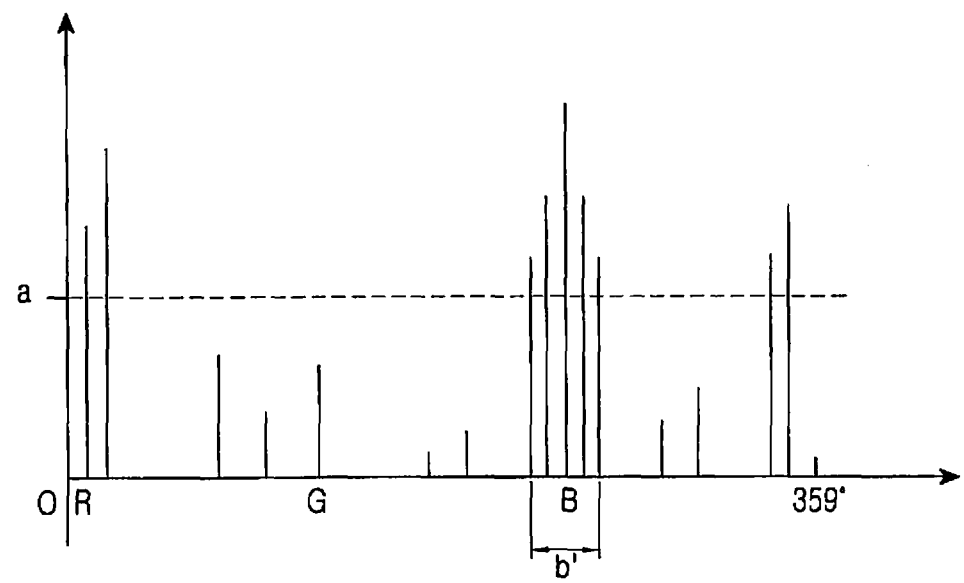

In FIG. 2B,. The controller 100 densely sets the range of blue color corresponding to b of FIG. 2A into the range of blue color corresponding to b' of FIG. 2B.

The main colors on the screen are shown clearer and more distinct to the user in comparison with previous colors.

Figures 3, 4A, 4B, 4C:
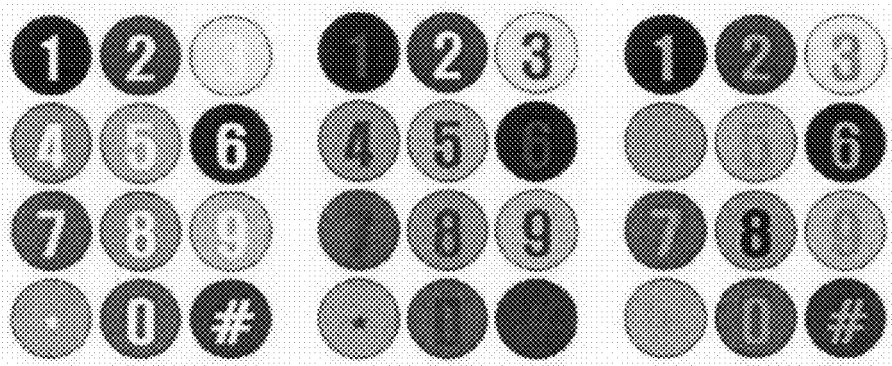
FIG. 3 illustrates a complementary color contrast table according to the present invention.
FIGS. 4A to 4C illustrating a keypad screen, which is configured based on complementary color contrasted color values, according to the present invention.

Then, the controller 100 determines whether the respective colors, which have been set as described above, have a complementary color relation of a pair of colors with color contrast. That is, when the number of the set colors is two, the controller 100 checks if these colorshave a complementary color relation by using a complementary color contrast table showing complementary color relation, as shown in FIG. 3. In such a table, in the case of numeral 1 of FIG. 4A where a background color is black, and a numeral color is white, the controller 100 determines that two colors are complementary and have a visibility higher than visibility in a case of numeral 1 of FIG. 4Bb and visibility in the case of numeral 1 of FIG. 4C.

For example, it is assumed that two set colors are the background color and the text color of user interface, respectively. If the background color is blue, and the text color is red, the controller 100 determines a text color complementary to the blue color of the background color on the complementary color contrast table and compares the determined color with the text color of HSV data. If the checked color and the text color of the HSV data are not equal to each other, the controller 100 changes the text color of the HSV data into the checked color of the complementary color contrast table. That is, the controller 100 changes the text color from red to white, as shown in numeral 6 of FIG. 4A.

When at least three colors are included in the HSV data, it is difficult to set the three colors in complementary color relation.

Accordingly, when at least three colors have been determined by using a color distribution histogram, the controller 100 determines whether each determined color has good visibility. At this time, colors with good visibility are previously distinguished, and visibility distinction information regarding the distinguished colors is stored in the memory unit 160. For example, the memory unit 100 can store visibility distinction information, which include a yellow, a bluish green, and a yellowish green color with inferior visibility and includes an orange, a magenta, a red, and a blue color with superior visibility.

If the three determined colors are yellow, bluish green, and yellowish green, the controller 100 recognizes the corresponding colors as having inferior visibility and changes the corresponding colors into orange, blue, and green.

As such, the controller 100 changes the HSV data including at least three colors into color with superior visibility, thereby allowing a screen including at least three colors to be shown distinct to the user.

Hereinafter, the controller 100 again converts the HSV data having a color value, which has been set as described above through the HSV converter 130, into RGB data and the displays data including such RGB data through the displaying unit 120. If the two set colors are complementary, the controller 100 converts the HSV data, into RGB data and displays the displays data including such RGB data through the displaying unit 120.

In this manner, the controller 100 set pre-existing colors of display data configuring the screen into colors near primary colors, thereby improving visibility. Therefore, although the intensity of ambient light is high, the user can clearly recognize the colors of the display data configuring the screen.

The foregoing is an example where luminosity, saturation, and color tone are set. However, visibility can be improved by setting the size of each text and numeral configuring the screen to be larger than current size and setting the thickness of texts and numerals thicker than current thickness so as to allow texts and numerals displayed on the screen to be more distinct to the user.

Meanwhile, the key input part 110 includes a key for displaying the screen according to the brightness intensity of ambient light so as to transmit data of a key value corresponding to a key pressed by the user to the controller 110. That is, the screen is set by determining whether the brightness intensity of ambient light is higher than preset brightness intensity and is also set according to a request for setting the screen through the key input part 100.

The lighting sensor 140 is for detecting the brightness of ambient light. The light sensor measures the brightness intensity of ambient light and transmits the measured brightness intensity to the controller 100. It is noted that, any sensor for measuring the brightness intensity of ambient light may be used.

The HSV converter 130 converts RGB data of display data to HSV data using spaces of luminosity, saturation, and color tone. The HSV converter 130 sets a luminosity value and a saturation value so as to allow the luminosity contrast ratio of HSV data to become larger than the preset luminosity contrast ratio. The HSV converter 130 sets a color value, which has been determined by using the color distribution histogram, to be higher than a previous color value, and sets respective colors by using the complementary color contrast table into a complementary color relation.

The color analyzing unit 150 forms a color distribution histogram showing the distribution of a plurality of colors included in the converted HSV data.

The display unit 120 includes a Liquid Crystal Display (LCD) and displays the screen with a color value in a complementary color relation with a set luminosity and saturation values. Also, the display unit 120 displays a screen with the set luminosity, saturation, and color values.

The memory unit 160 stores the color distribution histogram formed by the color analysis unit 150 and stores a color selection critical value, which has been preset so as to select a color among colors included in the HSV data. Also, the memory unit 160 stores a complementary color contrast table showing a complementary color relation.

Figure 5:
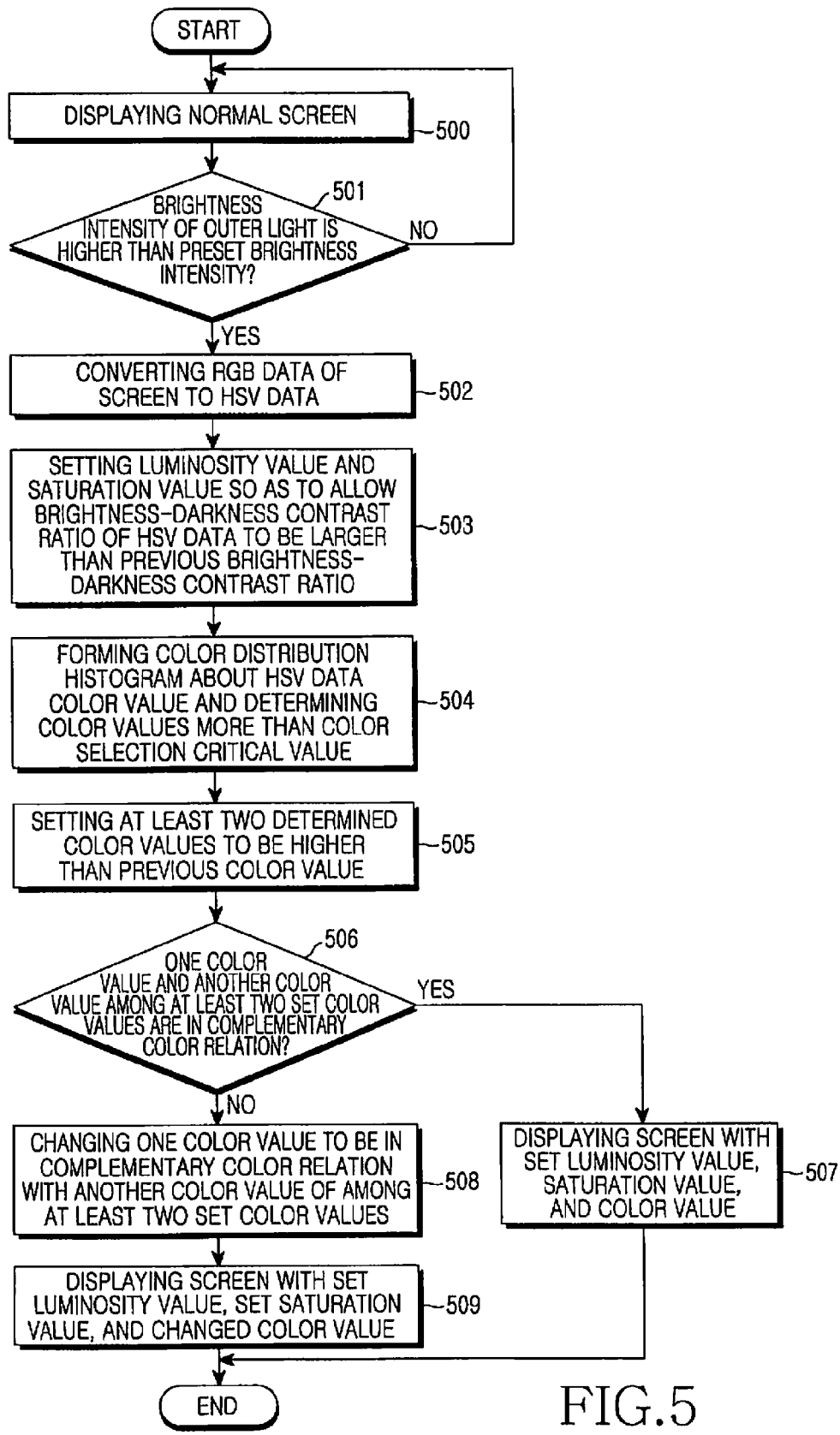
FIG. 5 illustrates a procedure of configuring a screen according to the present invention.

FIG. 5 illustrates a procedure of displaying a screen based on the intensity of ambient light according to the present invention.

An example where display data configuring a screen of a mobile communication terminal includes two colors will be described.

The displaying unit 110 of the mobile communication terminal displays a normal screen of the terminal in step 500. The normal screen refers to a terminal screen, which has been preset in the mobile communication terminal.

It is determined in step 501 whether the brightness intensity of ambient light measured from the lighting sensor 140 is higher than preset brightness intensity. If so, the controller 100 proceeds to step 502, and if it isn't, the normal screen is continuously displayed in step 500.

The controller 100 converts RGB data of the display data configuring the screen to HSV data through the HSV converter 130 in step 502.

The controller 100 sets a luminosity value and a saturation value of the HSV data so as to allow a light-darkness contrast ratio of HSV data to become larger than a preset darkness contrast ratio in step 503.

The controller 100 forms a color distribution histogram about HSV data through the color analyzing unit 150 and determines a color value equal to or higher than the color selection critical value among distributed colors in step 504.

The controller 100 sets a color value determined in step 504 as a value higher than a preset color value. That is, the controller 100 sets range b of FIG. 2A to be as dense as range b' of FIG. 2B.

The controller 100 determines whether one color value is in a complementary color relation with the other color among at least two preset color values in step 506. If it is, the controller 100 proceeds from step 506 to step 507, and if it isn't, the controller 100 proceeds from step 506 to step 508.

The controller 100 converts HSV data having the luminosity value and the saturation value, which have been set in step 503, and the color value set in step 505 to RGB data and displays the RGB data on the display unit 120 in step 507.

The controller 100, which proceeds from step 506 to step 508, changes any one color value of at least two set color values to another color value that has a complementary color relation with the other color value of the two set color values. For example, when a keypad background color is blue, and a text color is black, the controller 110 changes the text color from black to white to have a complementary color relation with the blue color of the keypad background.

In step 509, the controller 100 converts the HSV data, which has the luminosity value and a saturation value set in step 503 and the color value converted to be in a complementary relation in step 508, to RGB data and displays the RGB data on the display unit 120.

Figure 6A:
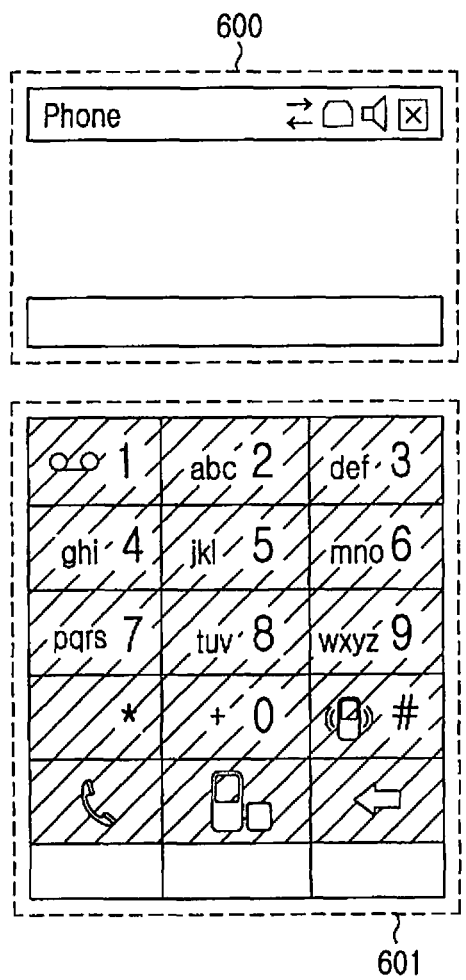
FIGS. 6A and 6B illustrates a screen configured according to the present invention.
Figure 6B:
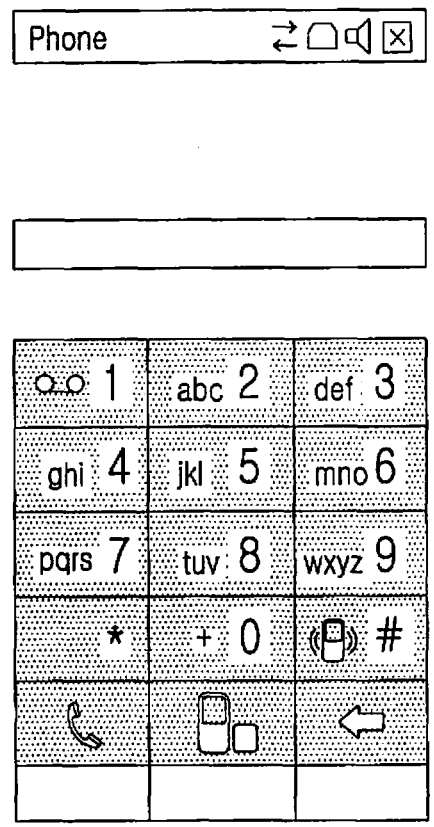

When the background color is yellow, and the text color is blue, the displayed screen configured by these colors appears as the screen shown in FIG. 6Aa. Also, when the background color is yellowish green, and the text color is blue, the screen configured by these colors appears as the screen shown in FIG. 6B.

Figure 7:
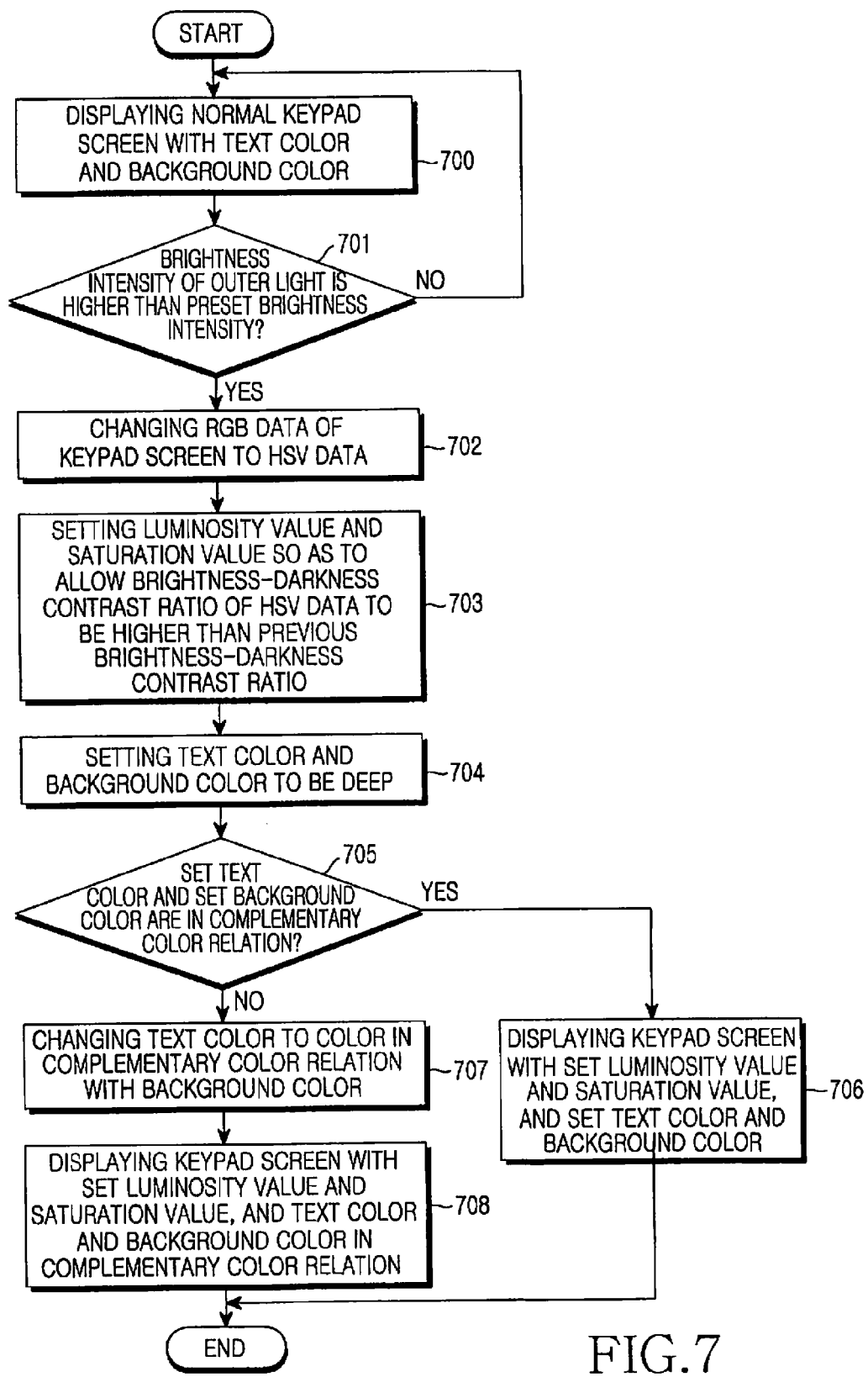
FIG. 7 illustrates a procedure of displaying a keypad screen based on two color values different from each other according of the present invention.

FIG. 7 illustrates a procedure of displaying a keypad screen having two color values according to of the present invention.

The controller 100 displays a normal keypad screen with a text color and a background color in step 700.

The controller 100 determines in step 701 whether the brightness intensity of ambient light is higher than preset brightness intensity through the lighting sensor 140. If so, the controller 100 proceeds to step 702, and if not, the controller returns to step 700 and continuously displays the normal screen.

The controller 100 converts the RGB data of display data configuring the keypad screen to HSV data in step 702 and sets luminosity and saturation values of HSV data so as to allow a light-darkness contrast ratio of the HSV data to become larger than a previous light-darkness contrast ratio in step 703.

The controller 100 forms a color distribution histogram about a text color and a background color and sets a text color and a background color into a distinct color in step 704. That is, the controller 100 sets each color range of the text color and the background color to be as dense as that shown in FIG. 2.

The controller 100 determines whether the set text and background colors are in an complementary color relation with each other in step 705. If so, the controller 100 proceeds to step 706. If not, the controller 100 proceeds to step 707.

The controller 100 displays a keypad screen with the luminosity value and saturation values, which have been set in step 703, and the text color and the background color, which have been set in step 704, through the display unit 120 in step 706.

The controller 100, in step 707, changes the text color into a color in complementary color relation with the background color. For example, when the background color is yellowish green, and the text color is white, the controller 100 changes the text color from white to blue in complementary color relation with yellowish green, which is the background color.

The controller 100 displays a keypad screen, which has the luminosity and saturation values set in step 703, and the background and text colors set in step 707, through the display unit 120 in step 708.

Meanwhile, in order to set texts on the keypad screen to have a visibility higher than that of previous texts, a step of setting the thickness of texts to be thicker than that of basic texts or setting the size of the texts to be larger than that of basic texts may be further included in the present invention.

Although the keypad screen 601 shown in FIG. 6A has been described, it is possible to set the screen 600 with icons and letters according to brightness intensity of ambient light as described above. The icon has several color values, such that the colors of the icon can be shown distinct to the user by setting each color value of the icon to be larger than its previous color value.

In addition, the colors of the icon can be shown distinct to the user in such a manner that two color values among several color values of the icon are selected and set into a complementary color relation with each other, and the remaining color values are set to be larger than its previous color values.

As such, when the brightness intensity of ambient light becomes higher than the preset brightness intensity so that the user can not accurately recognize the screen, the present invention increases luminosity and saturation of the screen, and sets deeper colors or changes colors have complementary color relation, thereby allowing the screen of a mobile communication terminal to be shown distinctly to the user even where the ambient light is very bright.

According to the present invention, a screen display is configured to be shown brighter than the previous screen without the consumption of power in such a manner that the luminosity and saturation values of the display data configuring the screen are set higher than preset luminosity and saturation values according to the brightness intensity of the ambient light, and the color values are set into preset color values.

As such, the present invention improves the visibility of the screen so as to allow the user to accurately recognize the screen even when the brightness intensity of the ambient light is high.

What is claimed is:

1. An electronic device for displaying data according to brightness intensity of ambient light, the electronic device comprising:
   a measuring sensor for measuring brightness intensity of ambient light;
   a display unit for displaying data; and
   a controller for setting one or more color characteristic values configuring the display data to be higher than a preset value when the brightness intensity of the ambient light measured by the measuring sensor is higher than a preset brightness intensity, determining whether one color value and another color value among the set color characteristic values are in a complementary color relation and, if so, maintaining the color values, and displaying display data including the maintained color values, and if not, converting the another color value to a color value in color complementary relation with the one color and maintaining the one color value, and displaying display data including the converted another color value and the maintained one color value.

2. The electronic device as claimed in claim 1, wherein the color characteristic value comprises at least one of a luminosity value, a saturation value, and a color value.

3. The electronic device as claimed in claim 2, wherein the controller sets a luminosity value and a saturation value, which are equal to or lower than each preset first reference value of a luminosity value and a saturation value included in the color characteristic value, as a luminosity value and a saturation value, which are lower than current values, in order to allow a dark part of the display data to be shown darker, and sets a luminosity value and a saturation value, which are equal to or higher than each preset second reference value of a luminosity value and a saturation value included in the color characteristic value, as a luminosity value and a saturation value, which are higher than current values, in order to allow a bright part of the display data to be shown brighter.

4. The electronic device as claimed in claim 3, wherein the controller determines a color value equal to or higher than a preset color selection critical value among one or more color values by using a color distribution histogram showing a distribution of the one or more color values included in the color characteristic value and sets the determined color value as a color value near a primary color value in comparison with the preset color value.

5. The electronic device as claimed in claim 4, wherein the determined color value increases as a color becomes more distinct.

6. A method for displaying data according to brightness intensity of ambient light, the method comprising:
   setting one or more characteristic values configuring display data to be higher than a preset value when a measured brightness intensity of ambient light is higher than a preset brightness intensity of ambient light;
   determining whether one color value and another color value among the set color values are in complementary color relation, and
   if in complementary relation, maintaining the color values, and displaying display data including the maintained color values;
   if the one color value and the another color value are not in the complementary relation, converting the another color value to a color value in a complementary color relation with the one color value and maintaining the one color value; and
   displaying display data including the another converted color value and the maintained one color value.

7. The method as claimed in claim 6, wherein the color characteristic value comprises at least one of a luminosity value, a saturation value, and a color value.

8. The method as claimed in claim 7, wherein the step of setting the color characteristic value to be higher than a preset value comprises setting a luminosity value and a saturation value, which are equal to or lower than each preset first reference value of a luminosity value and a saturation value configuring the display data, as a luminosity value and a saturation value, which are lower than current values, in order to allow a dark part of the display data to be shown darker, and setting a luminosity value and a saturation value, which are equal to or higher than each preset second reference value of a luminosity value and a saturation value configuring the display data, as a luminosity value and a saturation value, which are higher than current values, in order to brighten a bright part of the display data.

9. The method as claimed in claim 8, wherein the step of setting the color characteristic value to be higher than a preset value comprises determining a color value equal to or higher than a preset color selection critical value among one or more color values by using a color distribution histogram showing distribution of the one or more color values included in the color characteristic value and setting the determined color value as a color value near a primary color value in comparison with the preset color value.

10. The method as claimed in claim 9, wherein the determined color value increases as a color becomes more distinct.

* * * * *